United States Patent Office 2,823,138
Patented Feb. 11, 1958

2,823,138
THERMOFLUID VEHICLE

Lewis C. Hoffman, Scotch Plains, N. J., assignor to E. I. du Pont de Nemours and Company, Wilmington, Del., a corporation of Delaware No Drawing. Application May 29, 1956
Serial No. 587,918

4 Claims. (Cl. 106—311)

This invention relates to thermofluid vehicles which are particularly adapted for use in preparing vitreous enamel color compositions comprising the thermofluid vehicle, a vitreous enamel frit, and a ceramic pigment.

Vitreous enamel color compositions of this type have been known for some years and were developed for the rapid application of successively superimposed colors. Such compositions are solid at room temperature and are liquid at slightly elevated temperatures, for example, temperatures of between 120° F. and 212° F. These compositions, therefore, have the advantage of solidifying rapidly on surfaces of room temperature and eliminate drying operations between color applications.

Thermofluid vehicles, in order to function properly in vitreous enamel color compositions, must have certain rather precise physical and chemical properties.

(1) Such vehicles must melt quickly within a narrow temperature range without substantial physical or chemical change.
(2) They must not run after application to a surface.
(3) They must level off properly before solidifying.
(4) They must operate substantially the same at varying room temperatures.
(5) They must adhere well to a glass, ceramic or metal surface to which they are applied.
(6) The finely divided vitreous enamel frit and ceramic pigments must remain properly dispersed in the vehicle.
(7) The vehicle must not gel in its molten condition.
(8) The vehicle must remain stable over prolonged periods of time and not be subject to change upon aging.
(9) The applied color must remain moisture-resistant.
(10) The vehicle must be completely removed by volatilization upon firing without leaving objectionable carbon deposits.

It will be readily apparent that in view of these essential specifications great difficulty has been experienced in producing thermofluid vehicles that are uniformly suitable for vitreous enamel color compositions.

In order that thermofluid vehicles will have the specified characteristics it has been found necessary to compound the same within a number of different substances including natural and synthetic resins, natural and synthetic waxes, thickening-preventive agents, stabilizing agents, thinning agents, and the like. Moreover, such vehicles have heretofore been compounded with one or more natural waxes or natural resins, or resins or waxes extracted from natural products.

It is an object of this invention to produce an improved thermofluid vehicle suitable for use in vitreous enamel color compositions.

It is another object of this invention to produce a thermofluid vehicle for vitreous enamel color compositions that will have uniform properties from batch to batch.

Other objects of the invention will appear hereinafter.

These objects may be accomplished, in general, by preparing a thermofluid vehicle, at least 90% of which consists of a combination of a polyethylene glycol having an average molecular weight of 1000 to 20,000, and a saturated monohydroxy alcohol having 12 to 20 carbon atoms in the molecule. Such polyethylene glycols and saturated monohydroxy alcohols having very specific chemical compositions and being of a completely synthetic nature can be readily purchased on the market. These substances are frequently classified as waxes or wax-like materials.

As examples of suitable polyethylene glycols may be mentioned the "Carbowaxes" 1000, 1540, 4000, 6000, and 20,000 manufactured and sold by the Carbide and Carbon Chemicals Corporation. These "Carbowaxes" have the following molecular weights and melting points:

"Carbowax" 1000:
    Average mol. wt_____ 950–1050
    Melting point_____°C__ 35–40
"Carbowax" 1500:
    Average mol. wt_____ 500–600
    Melting point_____°C__ 35–40
"Carbowax" 1540:
    Average mol. wt_____ 1300–1600
    Melting point_____°C__ 40–45
"Carbowax" 4000:
    Average mol. wt_____ 3000–7000
    Melting point_____°C__ 50–55
"Carbowax" 6000:
    Average mol. wt_____ 6000–7500
    Melting point_____°C__ 58–62
"Carbowax" 20,000:
    Average mol. wt_____ 15,000–20,000
    Melting point_____°C__ About 60

As examples of suitable saturated monohydroxy alcohols may be mentioned:

1-dodecanol (lauryl alcohol)_____ 12 C atoms, M. P. 24° C.
1-tridecanol (tridecyl alcohol)_____ 13 C atoms, M. P. 30.5° C.
1-tetradecanol (tetradecyl alcohol)____ 14 C atoms, M. P. 38° C.
1-pentadecanol (n-pentadecyl alcohol)_ 15 C atoms, M. P. 45° C.
1-hexadecanol (cetyl alcohol)_____ 16 C atoms, M. P. 49° C.
1-heptadecanol (heptadecyl alcohol)___ 17 C atoms, M. P. 53° C.
1-octadecanol (stearyl alcohol)_____ 18 C atoms, M. P. 58.5° C.

"Adol" 54 ($C_{14}$—1.9%, $C_{16}$—62.0%, $C_{18}$—34.1%, $C_{20}$—2.0%; M. P. 49°–53° C.) made and sold by Archer-Daniels-Midland Corp.

"Adol" 64 ($C_{16}$—24.3%, $C_{18}$—68.6%, $C_{20}$—7.1%; M. P. 54°–57° C.) made and sold by Archer-Daniels-Midland Corp.

"Dytol" E-46 ($C_{14}$—1.2%, $C_{16}$—34.0%, $C_{18}$—64.8%; M. P. 50°–54° C.) made and sold by Rohm & Haas Company.

The polyethylene glycols and fatty alcohols should be mixed in the vehicle in the following proportions by weight:

|  | Percent |
|---|---|
| Polyethylene glycol having a molecular weight of 15,000–20,000 | 2 to 25 |
| Polyethylene glycol having a molecular weight of 1000–6000 | 2 to 40 |
| Saturated monohydroxy alcohol | 36 to 70 | the vehicle consisting of at least 90% by weight of polyethylene glycols and saturated monohydroxy alcohols. Although not an essential ingredient, it is preferred to add to the vehicle up to 4% by weight of lecithin or phosphorated tall oil as a moisture attack preventing agent. A polyethylene glycol of 15,000–20,000 average molecular weight is substantially insoluble in saturated monohydroxy alcohol. It has been found, however, that the presence of a small quantity of polyethylene glycol of average molecular weight between 1000 and 6000 will promote the solubility of the higher molecular weight polyethylene glycol in the alcohol.

The vehicle of this invention may be mixed with a vitreous enamel color, comprising an enamel frit and an inorganic pigment, in the ratio of 1:2 to 1:6 by weight. The preferred ratio of vehicle to vitreous enamel color is 1:4 to 1:5.

The vehicle of this invention may be mixed with the vitreous enamel colors at or slightly above the melting point of the vehicle. Very good results have been obtained by first heating the vitreous enamel colors and then mixing the hot colors with the vehicle. If desired, the vehicle ingredients may be mixed with the enamel colors at the time the vehicle itself is compounded.

Vitreous enamel colors conventionally used for the preparation of thermofluid vitreous enamel color compositions are composed of 5% to 20% by weight of finely ground inorganic pigments and 95% to 80% by weight of finely divided vitreous enamel frit. Usually metal borosilicates, for example, lead or cadmium borosilicate glass frits, are employed in compositions as above described.

The following examples describe several preferred vehicles and vitreous enamel color compositions of this invention. It is to be understood that the specific details given in the examples are not to be considered as limiting the scope of the invention.

*Example I*

Thirty-four percent (34%) "Carbowax" 1540 (a polyethylene glycol made and sold by Carbide and Carbon Chemicals Corporation), 14.6% "Carbowax" 20M (a polyethylene glycol manufactured and sold by Carbide and Carbon Chemicals Corporation), 48.5% "Adol" 54 (a mixed fatty alcohol made and sold by Archer-Daniels-Midland Corporation), and 2.9% soya lecithin are placed in a stainless steel receptacle and melted at a temperature of 200° F. while stirring. The molten composition is poured over a vitreous enamel color composed of 15% of finely ground inorganic ceramic pigment and 85% of finely divided lead borosilicate glass frit, and the entire mass maintained at a temperature of about 200° F. while stirring until thoroughly mixed. The ratio of vehicle ingredients to vitreous enamel color is 1:4 parts by weight. The resulting composition is highly useful as a squeegee paste when used with a screen stencil heated either by infrared lights or by resistance wires in the screen so as to maintain the paste in a molten condition. The paste may be applied to glass bottles with repeated applications of different colors to produce a multicolored design which may be fired in a glass firing lehr at a temperature of about 625° C. to produce a beautiful finished bright, glossy design.

*Example II*

23.4% "Carbowax" 1540
14.0% "Carbowax" 20M
56.0% "Adol" 64
6.6% tallicin (phosphorated tall oil)

The above ingredients are melted and compounded with a vitreous enamel color as in Example I with a ratio of vehicle to vitreous enamel color of 1:4.5. The resulting color composition may be placed on a heated screen stencil to maintain the composition molten and applied by squeegee on a glass or ceramic surface. The object may then be subjected to firing in a firing lehr to produce a permanent, bright, glossy design on the object.

The process of Example I may be similarly practiced to produce desirable multicolored designs of vitreous coloring compositions using the following thermofluid vehicles.

*Example III*

24.3% "Carbowax" 1000
14.6% "Carbowax" 20M
29.1% "Adol" 54
29.1% "Adol" 64
2.9% soya lecithin The ratio of vehicle ingredients to vitreous color in this example is 1:5.

*Example IV*

29.2% "Carbowax" 1540
9.7% "Carbowax" 20M
58.2% stearyl alcohol
2.9% soya lecithin The ratio of vehicle ingredients to vitreous color in this example is 1:4.

*Example V*

24.3% "Carbowax" 4000
7.8% "Carbowax" 20M
65.0% cetyl alcohol
2.9% soya lecithin The ratio of vehicle ingredients to vitreous color in this example is 1:4.

In the above-mentioned examples the phosphorated tall oil or lecithin may be omitted in any case where moisture attack on the printed vitreous enamel color is of little or no concern.

The vehicles of the present invention have the advantage of complying with the ten specified characteristics referred to above in the specification. Furthermore, the thermofluid vehicles of this invention may be produced with uniform characteristics from batch to batch in view of the fact that the vehicle composition consists primarily of materials having very specific chemical compositions and being manufactured as completely synthetic materials. The fatty alcohol-polyethylene glycol vehicles of this invention do not show deleterious aging and give glossy fired decorations. Moreover, they show decreased tendency to run down the bottle when submitted to the firing lehr.

Throughout the specification and claims, any reference to parts, proportions, and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. A thermofluid vehicle for a vitreous enamel color composition at least 90% of which consists of 2% to 25% of a polyethylene glycol having an average molecular weight of 15,000 to 20,000, 2% to 40% of a polyethylene glycol having an average molecular weight of 1000 to 6000, and 36% to 70% of a saturated straight chain aliphatic monohydroxy alcohol having 12 to 20 carbon atoms in the molecule.

2. The thermofluid vehicle of claim 1 containing up to 4% of a phosphorous containing compound taken from the group consisting of lecithin and phosphorated tall oil.

3. A vitreous enamel color composition composed of a thermofluid vehicle and a vitreous enamel color in the ratio of 1:2 to 1:6, said color composed of a finely divided vitreous enamel frit and an inorganic pigment, at least 90% of said vehicle consisting of 2% to 25% of a polyethylene glycol having an average molecular weight of 15,000 to 20,000, 2% to 40% of a polyethylene glycol having an average molecular weight of 1000 to 6000, and 36% to 70% of a saturated straight chain aliphatic monohydroxy alcohol having 12 to 20 carbon atoms in the molecule.

4. A vitreous enamel color composition as defined in claim 3 in which the vehicle contains up to 4% of a phosphorous containing compound taken from the group consisting of lecithin and phosphorated tall oil.

References Cited in the file of this patent

UNITED STATES PATENTS

| | | |
|---|---|---|
| 2,607,701 | Jessen | Aug. 19, 1952 |
| 2,617,740 | Morris | Nov. 11, 1952 |
| 2,662,031 | Vogel et al. | Dec. 8, 1953 |
| 2,757,142 | Ryznar | July 31, 1956 |
| 2,758,100 | Bailly et al. | Aug. 7, 1956 |